United States Patent
Bischoff

(10) Patent No.: US 6,215,568 B1
(45) Date of Patent: Apr. 10, 2001

(54) WDM SWITCHING NETWORK

(75) Inventor: Mathias Bischoff, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/117,943

(22) PCT Filed: Feb. 13, 1997

(86) PCT No.: PCT/DE97/00280

§ 371 Date: Aug. 10, 1998

§ 102(e) Date: Aug. 10, 1998

(87) PCT Pub. No.: WO97/30529

PCT Pub. Date: Aug. 21, 1997

(30) Foreign Application Priority Data

Feb. 16, 1996 (DE) .............................. 196 05 808

(51) Int. Cl.[7] .................................................. H04J 14/02
(52) U.S. Cl. ............................................. 359/128; 359/117
(58) Field of Search ................................. 359/117, 128, 359/124, 123

(56) References Cited

U.S. PATENT DOCUMENTS

| | | | |
|---|---|---|---|
| 4,845,703 | * | 7/1989 | Suzuki ..................................... 370/3 |
| 5,510,921 | * | 4/1996 | Takai et al. .......................... 359/124 |

FOREIGN PATENT DOCUMENTS 0 642 288 A2   8/1995  (EP) .

OTHER PUBLICATIONS

IEEE INFOCOM (1993), vol. 2, San Francisco, USA, XP000399037 K.C. Lee et al, "Routing and Switching In A Wavelength Convertible Optical Network[1]", pp. 578–585.

International Switching Symposium, vol. 2, (1992), Yokohama JP, XP000337742, P.J. Chidgey et al, "Wavelength and Space Switched Optical Networks and Nodes", pp. 352–356.

IEICE Transactions on Communications, vol. E77–B, No. 10, (1994), Tokyo JP, XP000492774, A. Watanabe et al, "Optical Path Cross–Connect Node Architecture with High Modularity for Photonic Transport Networks", pp. 1220–1229.

IEEE Communications Magazine, vol. 33, No. 11, New York, USA, XP000545290, F. Derr, et al, "An Optical Infrastructure for Future Telecommunications Networks", pp. 84–88.

* cited by examiner

*Primary Examiner*—Jason Chan
*Assistant Examiner*—Chau M Nguyen
(74) *Attorney, Agent, or Firm*—Schiff Hardin & Waite

(57) ABSTRACT

In a wavelength-division multiplex switching network having input wavelength-division multiplex (λ) demultiplexers followed by a space switch and output wavelength-division multiplex multiplexers, wavelength-individual space switching matrices which are in each case connected, at the input end, via a number, corresponding to the number of wavelength-division multiplex multiplexers, of link lines to corresponding outputs of the space switch, lead to the wavelength-division multiplex multiplexers, some of the link lines leading to a space switching matrix directly connect the space switch to the respective space switching matrix and an adjustable wavelength converter is in each case inserted into the remaining link lines.

2 Claims, 1 Drawing Sheet

WDM SWITCHING NETWORK

BACKGROUND OF THE INVENTION

Modern optical wide-area networks which are resistant to obsolescence must meet high demands with respect to capacity, flexibility, reliability and transparency. These demands on a transport network are met to an optimum degree when the data is transmitted and switched in optical frequency-division multiplex. In the case of optical frequency-division multiplex (wavelength-division multiplex—WDM), a plurality of transmission channels, which are separated from one another by their optical carrier frequencies (wavelengths) differing by several hundred GHz from one another, are concentrated in one fiber. The maximum number of channels possible is limited by the gain bandwidth of optical amplifiers.

Photonic networks having high-bit-rate fiber-based transmission links, optical frequency-division multiplex (wavelength-division multiplex—WDM) and WDM switching networks for semipermanent switching of optical channels as the future transport networks of the telecommunication service providers will initially have to be installed as overlay networks forming the backbone for the networks existing today; The continuously increasing demand for transmission capacity will lead to a continuous expansion of the photonic networks.

The WDM switching networks provided for semipermanent permanent and non-blocking switching of optical channels are so-called optical cross-connects (OCC). As a rule, such optical cross-connects have both a frequency switching stage and a space switching stage. In this connection, a WDM switching network comprising input WDM demultiplexers, which in each case divide the incoming optical signal from the associated input fiber in accordance with wavelengths, followed by a space switch, adjustable wavelength converters, which convert the respective incoming wavelength to the respective outgoing wavelength, and output WDM multiplexers, which combine the wavelengths supplied to them, is known from ICC'93 Conf. Rec. Vol. 3/3, 1300 . . . 1307, FIG. 10.

From ntz 46 (1993)1, pages 16 . . . 21, FIGS. 13 and 14, WDM switching networks are known in which input WDM demultiplexers (1/N in FIG. 13; unlabeled in FIG. 14), output WDM multiplexers (N/1 in FIG. 13; unlabeled in FIG. 14), wavelength converters (frequency stages in FIG. 13; filters and frequency converters in FIG. 14) for converting a wavelength to the respective outgoing wavelength and an intermediate space switch (space stage in FIG. 13; fiber-optical switch in FIG. 14) are also provided.

From U.S. Pat. No. 5,194,409, a switching network is known in which (according to FIG. 3) wavelength-individual space switching matrices (70) lead to WDM multiplexers (59).

From U.S. Pat. No. 5,194,977, a switching network (23 in FIG. 2) comprising wavelength converters (17-1 . . . 17-4) is known.

The wavelength converters (optical frequency converters) provided in WDM switching networks make it possible to keep down the probability of blocking for connections to be newly set up in photonic networks even with high network usage. However, optical frequency converters represent relatively expensive subsystems, on the one hand, whilst, on the other hand, a connection may not actually require frequency conversion in every WDM switching network. To take account of this, frequency converters which can be inserted into a connection can be provided in a WDM switching network as required.

In the case of a WDM switching network having p WDM demultiplexers, which in each case divide the incoming n-channel WDM signal from the associated input fiber in accordance with wavelengths (optical frequencies), followed by a space switch and p output WDM multiplexers combining the n optical signals supplied to them into an n-channel WDM signal, it is already known in this connection to provide wavelength converters in a wavelength converter pool located between additional outputs and inputs of the space switch and to insert from this pool, only if required, a wavelength converter into a connection conducted via the WDM switching network (OFC'95 Technical Digest, 271 . . . 272; IEEE Communications Magazine, November 95, 84 . . . 88).

Such a WDM switching network is drawn in FIG. 1. Firstly, this WDM switching network exhibits p input ports and p output ports and input and, respectively, output fibers E1 . . . , Ep and, respectively, A1, . . . , Ap connected thereto for WDM signals (optical frequency-division multiplex signals comprising in each case n optical channels and in each case q ports e1, . . . , eq and, respectively, a1, . . . , aq at the input and, respectively, output end for signal-channel signals. The p input fibers E1, . . . , Ep in each case lead to a WDM demultiplexer D1, . . . , Dp which divides the incoming WDM signal (optical frequency-division multiplex signal) at the respective input port in accordance with wavelengths λ1, . . . , λn (optical frequencies). The maximum total of p·n outputs of the p WDM demultiplexers are connected to p·n inputs of an (integrated) optical space switch network R. At the output end, p·n outputs of the space switching network R are connected to the in each case n inputs of p WDM multiplexers M1, . . . , Mp which in each case combine the n signals of different wavelengths (λ1, . . . , λn) supplied to them into a WDM (optical frequency division multiplex) signal and which, in turn, lead to the output ports of the WDM switching network and the output fibers A1, . . . , Ap connected thereto.

In a wavelength converter pool KP located between additional m·n outputs and m·n inputs of the space switching network R, m·n wavelength converters K11, . . . , Knm are provided, namely m frequency converters K11, . . . ; . . . , Knm for each of the n wavelengths, where m≦p. In the WDM switching network drawn in FIG. 1, the input ports are located on the left in the figure and the output ports of the WDM switching network are located on the right in the case where the input wavelength is variable and the output wavelength is fixed in the wavelength converters, whilst the input ports are on the right and the output ports are on the left in the figure in the case of a fixed input wavelength and variable output wavelength. The drawing of FIG. 1 thus covers both cases.

It is of disadvantage in this WDM switching network that the magnitude (q+p·n+m·n)×(q+p·n+m·n) of the space switching network R depends on the number m of the wavelength converters. When the WDM switching network is being installed, its planned maximum extension must therefore be known already; it is not possible to extend beyond this planned value.

Since the blocking probability, and thus the requirement for wavelength converters, only increases with an increasing traffic load, it is desirable to be able to extend WDM switching networks progressively with wavelength converters, and that without impairing the freedom of such an extension due to assumptions and plannings which may already be superseded. It must not be assumed in this connection that a wavelength converter is capable of converting any input wavelength into any output wavelength.

Instead, it must be assumed that wavelength converters which can be implemented with economically justifiable expenditure (without continuously tunable filters and/or sources) will convert any input wavelength to a fixed output wavelength (or conversely).

SUMMARY OF THE INVENTION

The invention then points to a way of making it possible to extend a WDM switching network with that much freedom.

The invention relates to a WDM switching network comprising input WDM demultiplexers which in each case divide the incoming optical signal from the associated input fiber in accordance with wavelengths, followed by a space switch and output WDM multiplexers combining the signals of different wavelengths supplied to them, and adjustable wavelength converters which are inserted between the space switch and WDM multiplexers and convert a respective incoming wavelength to the respective outgoing wavelength; according to the invention this WDM switching network is characterized in that wavelength-individual space switching matrices which, at the input end, are in each case connected via a number, corresponding to the number of WDM multiplexers, of link lines are connected to corresponding outputs of the space switch, lead to the WDM multiplexers, in which arrangement, at the best, some of the link lines leading to a space switching matrix directly connect the space switch to the respective space switching matrix and an adjustable wavelength converter, which converts a respective incoming wavelength to the respective outgoing wavelength, is in each case inserted into the remaining link lines.

The invention has the advantage of being able to provide a WDM switching network, which may even initially be installed without wavelength converters, progressively with frequency converters without this having to entail an enlargement of the space switching array; at the same time, fewer space switching points are needed overall in most cases.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
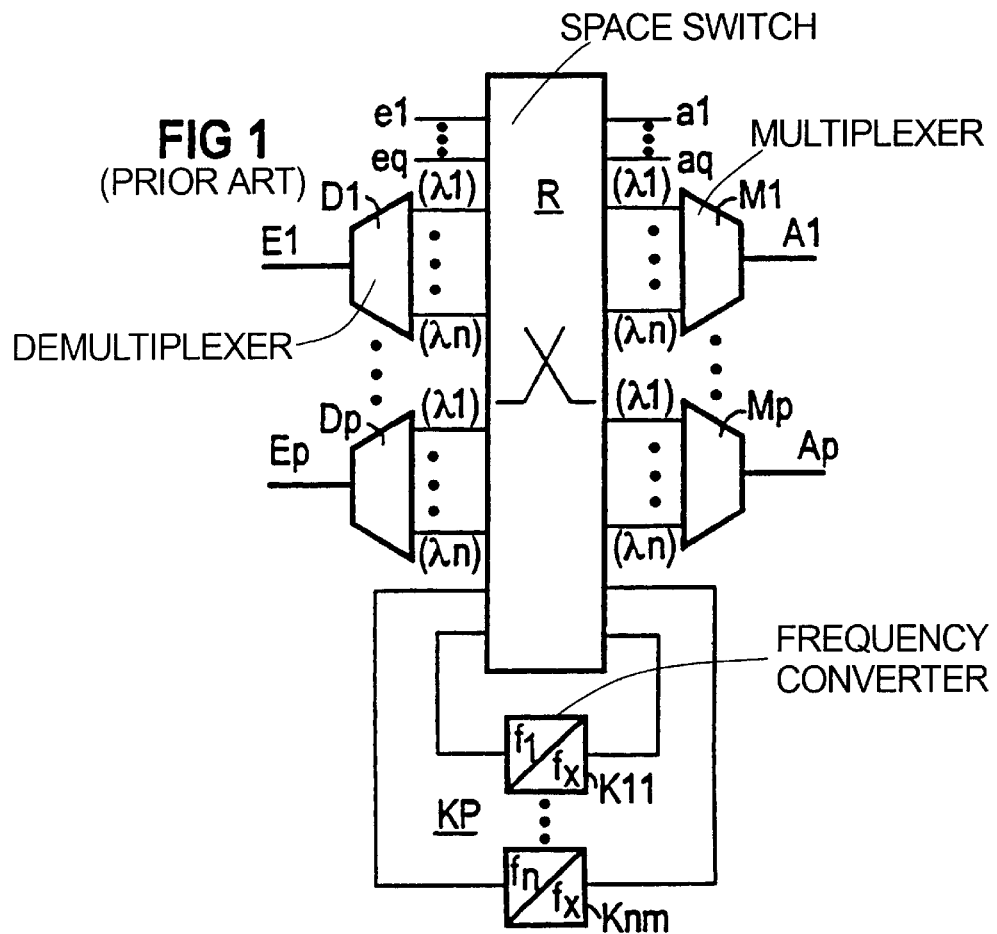
FIG. 1 shows a block diagram of a known WDM switching network.

The WDM switching network shown in FIG. 1 has already been explained above so that other explanations are unnecessary at this point.

Figure 2:
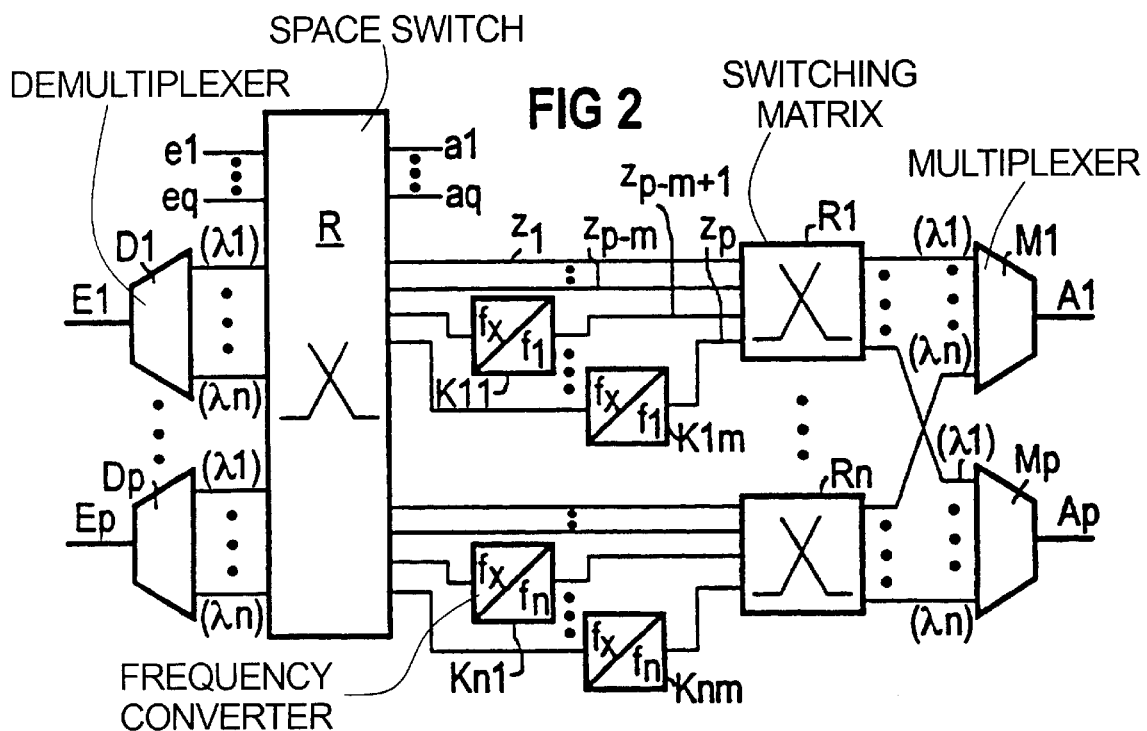
FIG. 2 shows the block diagram of an illustrative embodiment of a WDM switching network according to the invention.

In FIG. 2, an illustrative embodiment of a WDM switching network, in which the invention is applied, is drawn diagrammatically. This WDM switching network, in turn, exhibits p input ports and p output ports and input and, respectively, output fibers E1, . . . , Ep and, respectively, A1, . . . , Ap connected thereto for WDM signals (optical frequency-division multiplex signals) comprising in each case n optical channels and in each case q ports e1, . . . , eq and, respectively, a1, . . . , aq for single-channel signals at the input and, respectively, output end. The p input fibers E1, . . . , Ep in each case lead to a WDM demultiplexer D1, . . . , Dp which divides the incoming WDM signal (optical frequency-division multiplex signal) at the respective input port in accordance with wavelengths λ1, . . . , λn (optical frequencies). The maximum total of p·n outputs of the p WDM demultiplexers are connected to p·n inputs of an (integrated) optical space switch R. p·n outputs of the space switch R, in turn, are connected to WDM multiplexers M1, . . . , Mp which in each case combine the n signals of different wavelengths (λ1, . . . , λn) supplied to them into a WDM (optical frequency-division multiplex) signal and which, in turn, lead to the output ports of the WDM switching network and the output fibers A1, . . . , Ap connected thereto.

The situation in the WDM switching network drawn in FIG. 2 is that wavelength-individual space switching matrices R1, . . . , Rn., which are connected at the input end in each case via a number p, corresponding to the number of WDM multiplexers M1, . . . , Mp, of link lines $z_1, \ldots, z_{p-m}$; $z_{p-m+1}, \ldots, z_p$ to corresponding outputs of the space switch R lead to the WDM multiplexers M1, . . . , Mp. In this arrangement, p−m link lines $z_1 \ldots, Z_{p-m}$ leading to a space switching matrix R1, . . . , Rn connect the space switch R directly to the respective space switching matrix R1, . . . , Rn, whilst an adjustable wavelength converter K11, . . . , K1m; . . . , Kn1, . . . , Knm is in each case inserted into the remaining m link lines $z_{p-m+1}, \ldots, z_p$, which converter converts a respective incoming wavelength to the respective outgoing wavelength.

The disadvantage of the WDM switching network according to FIG. 1, namely that the size (q+pn+mn)×(q+pn+mn) of its space switching network is dependent on the number m of the wavelength converters, is avoided in the WDM switching network drawn in FIG. 2.

As is shown in FIG. 2, the WDM switching network according to the invention contains, on the one hand, a switching network array of size (q+np)×(q+np), namely the space switch R and, on the other hand, n switching network arrays of size p×p, namely the space switching matrices R1, . . . , Rn. The total size of the switching network arrays is independent of the number m of the wavelength converters K11, . . . ; . . . ; Kn1, . . . installed in each case. The WDM switching network can be installed initially without frequency converters (m=0) and can be progressively upgraded with wavelength converters until a wavelength converter is inserted into each link line extending between the space switch R and a wavelength-individual space switching matrix R1, . . . , Rn (m=p).

At the same time, the WDM switching network according to the invention manages in most cases with fewer switching (points than the known WDM switching network outlined in FIG. 1. This is the case with $$m > -\frac{q}{n} - p + \sqrt{\left(\frac{q}{n} + p\right) + \frac{p}{n}},$$

where m is the number of wavelength converters, n the number of optical channels in each case combined in the multiplex, p is the number of WDM input and output ports of the WDM switching network and q is the number of single-channel input and, respectively, output ports of the WDM switching network. The. saving in switching points can be quite considerable in this arrangement; it is 63% for, for example, m=12, n=8, p=16, q=2.

Finally, it should also be specially noted that in the WDM switching network according to the invention outlined in FIG. 2, the input wavelength can be variable and the output wavelength can be fixed or, conversely, the input wavelength can be fixed and the output wavelength can be variable; in the wavelength converters K11, . . . , Knm also.

The former case of a variable input wavelength and fixed output wavelength has already been explained above with reference to the drawing of FIG. 2; in this arrangement, the input ports of the WDM switching network outlined in FIG. 2 are on the left in the figure and the output ports are on the right.

In the converse case, namely if the input wavelength is fixed and the output wavelength is variable in the wavelength converters K11, . . . , Knm, the input ports are on the right and the output ports are on the left in the figure; at the same time, the roles of WDM demultiplexer and WDM multiplexer are reversed.

Seen in the drawing of FIG. 2, which also covers this case, the WDM switching network then exhibits p input ports with input fibers A1, . . . , Ap connected thereto and p output ports with output fibers E1, . . . , Ep connected thereto for WDM signals (optical frequency-division multiplex signals) comprising in each case n optical channels and, at the input end, q ports a1, . . . , aq and, at the output end, q ports e1, . . . , eq for single-channel signals. The p input fibers A1, . . . , Ap in each case lead to a WDM demultiplexer M1, . . . , Mp which divides the incoming WDM signal (optical frequency-multiplex signal) at the respective input port in accordance with wavelengths $\lambda 1$, . . . , $\lambda n$ (optical frequencies). The WDM demultiplexers M1, . . . , Mp lead to wavelength-individual (integrated) optical space switching matrices R1, . . . , Rn which, at the output end, are in each case connected via a number p, corresponding to the number of WDM multiplexers M1, . . . , Mp, of link lines $z_1$, . . . , $z_{p-m}$; $z_{p-m+1}$, . . . , $z_p$, to corresponding inputs of an (integrated) optical space switch R. In this arrangement, p−m link lines $z_1$, . . . , $z_{p-m}$ continuing from a space switching matrix R1, . . . , Rn, directly connect the respective space switching matrix R1, . . . , Rn to the space switch R whilst in each case an adjustable wavelength converter K11, . . . , K1m; . . . ; Kn1, . . . , Knm is inserted into the remaining m link lines $z_{p-m+1}$, . . . , $z_p$, which converter converts the respective incoming wavelength to a respective outgoing wavelength. p·n outputs of the space switch R, in turn, are connected to WDM multiplexers D1, . . . , Dp which in each case combine the n signals of different wavelengths ($\lambda 1$, . . . , $\lambda n$) supplied to them into a WDM (optical frequency-division multiplex) signal and which, in turn, lead to the output ports of the WDM switching network with the output fibers E1, . . . , Ep connected thereto.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A wavelength-division multiplex switching network comprising:

input wavelength-division multiplex demultiplexers, each of the demultiplexers dividing an incoming optical signal from an associated input fiber in accordance with wavelengths;

output wavelength-division multiplex multiplexers combining signals of different wavelengths supplied thereto;

a space switch connected to the demultiplexers and to the multiplexers;

adjustable wavelength converters which are located between the space switch and the multiplexers and convert a respective incoming wavelength to a respective outgoing wavelength;

wavelength-individual space switching matrices, which, at an input end, are each connected via a number (p), corresponding to the number of wavelength-division multiplex multiplexers, of link lines are connected to corresponding outputs of the space switch, lead to the wavelength-division multiplex multiplexers, some of the link lines leading to a respective space switching matrix directly connect the space switch to the respective space switching matrix; and a respective adjustable wavelength converter, which is one of said adjustable wavelength converters, which converts a respective incoming wavelength to a respective outgoing wavelength, located in each of the remaining link lines.

2. A wavelength-division multiplex switching network comprising:

input wavelength demultiplexers, each of the demultiplexers dividing an incoming optical signal from an associated input fiber in accordance with wavelengths;

output wavelength-division multiplex multiplexers, combining signals of different wavelengths supplied thereto;

a space switch connected between the demultiplexers and the multiplexers;

adjustable wavelength converters; wavelength-individual space switching matrices connected to the multiplexers, each of the multiplexers, at an output end, connected via a number p, corresponding to a number of the wavelength-division multiplex demultiplexers, of link lines, to corresponding inputs of the space switch, to outputs of which the wavelength-division multiplex multiplexers are connected, some of the link lines directly connecting a respective space switching matrix to the space switch; and a respective wavelength converter, which converts a respective incoming wavelength to a respective outgoing wavelength, located in each of the remaining link lines.

* * * * *